United States Patent
Kaneko et al.

(10) Patent No.: US 10,509,971 B2
(45) Date of Patent: Dec. 17, 2019

(54) LANDMARK RECOGNITION DEVICE AND LANDMARK RECOGNITION METHOD USING A DATABASE STORING LANDMARK EXTRACTION INFORMATION

(71) Applicant: Hitachi, Ltd., Chiyoda-ku, Tokyo (JP)

(72) Inventors: Alex Masuo Kaneko, Tokyo (JP); Kenjiro Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 69 days.

(21) Appl. No.: 15/753,767

(22) PCT Filed: Mar. 28, 2016

(86) PCT No.: PCT/JP2016/059797
§ 371 (c)(1),
(2) Date: Feb. 20, 2018

(87) PCT Pub. No.: WO2017/038134
PCT Pub. Date: Mar. 9, 2017

(65) Prior Publication Data
US 2018/0247139 A1    Aug. 30, 2018

(30) Foreign Application Priority Data

Aug. 28, 2015 (JP) .................................. 2015-169373

(51) Int. Cl.
*G06K 9/00* (2006.01)
*G05D 1/02* (2006.01)
(Continued)

(52) U.S. Cl.
CPC ....... *G06K 9/00798* (2013.01); *G05D 1/0246* (2013.01); *G06K 9/00818* (2013.01);
(Continued)

(58) Field of Classification Search
None
See application file for complete search history.

(56) References Cited

U.S. PATENT DOCUMENTS

2009/0088978 A1*    4/2009    Ishikawa ................ G01C 21/26
                                                   701/514

FOREIGN PATENT DOCUMENTS

JP      11-259639 A      9/1999
JP      2013-115559 A    6/2013
(Continued)

OTHER PUBLICATIONS

International Search Report (PCT/ISA/210) issued in PCT Application No. PCT/JP2016/059797 dated Jun. 14, 2016 with English translation (Two (2) pages).
(Continued)

*Primary Examiner* — Idowu O Osifade
(74) *Attorney, Agent, or Firm* — Crowell & Moring LLP

(57) ABSTRACT

Landmark recognition can handle various landmarks with a low processing load and high reliability. Provided are a database, a segmentation processor, a pattern extraction processor, and a database comparison processor. The database stores landmark extraction information associated with landmark determination condition information, the landmark extraction information identifying a region including a landmark of an image, and allowing right-opposite positioning of the landmark, the landmark determination condition information used for determining landmark pattern information as the landmark. The segmentation processor sets a plurality of segmentation lines with respect to the region including the landmark of the image in a direction parallel to the landmark from a direction right opposite to the landmark, and determines a distance between intersections of the segmentation lines and a boundary of the landmark. The pattern extraction processor obtains the landmark pat-
(Continued)

tern information that represents a characteristic of the pattern of the landmark as numerical value information in response to the distance between the intersections determined for each of the plurality of segmentation lines. The database comparison processor compares the landmark pattern information extracted in the pattern extraction processor with the landmark determination condition information registered in the database to identify the kind of the landmark.

5 Claims, 9 Drawing Sheets

(51) Int. Cl.
G06T 7/11 (2017.01)
G06T 1/00 (2006.01)

(52) U.S. Cl.
CPC .............. *G06T 1/0007* (2013.01); *G06T 7/11* (2017.01); *G06T 2207/30256* (2013.01)

(56) References Cited

FOREIGN PATENT DOCUMENTS

JP 2013-186664 A 9/2013
JP 2014-115931 A 6/2014

OTHER PUBLICATIONS

Japanese-language Written Opinion (PCT/ISA/237) issued in PCT Application No. PCT/JP2016/059797 dated Jun. 14, 2016 (Four (4) pages).

* cited by examiner

LANDMARK RECOGNITION DEVICE AND LANDMARK RECOGNITION METHOD USING A DATABASE STORING LANDMARK EXTRACTION INFORMATION

TECHNICAL FIELD

The present invention relates to a landmark recognition device and a landmark recognition method for allowing a moving body to recognize a landmark on a road, such as a road mark or a road sign.

BACKGROUND ART

An autonomous traveling (automatic traveling) technique and a drive assistant technique for controlling travel of a moving body, such as a robot or an automobile has been developed. Such techniques detect information of surrounding environment to control the travel in accordance with the situation, thus improving safety and convenience. The autonomous traveling estimates a traveling position of the moving body with, for example, accumulated information of speed and angular speed measured by an inertial measurement unit (IMU) or by position measurement using a global positioning system (GPS). The autonomous traveling detects travel lanes and road marks (stop lines, arrows, crosswalks) drawn on the road, or road signs installed on the roadside using a monocular camera, a stereo camera, a laser sensor, and so on, and uses such road marks and road signs as landmarks to control correction of the traveling position or stopping of the moving body. This requires a landmark recognition device capable of recognizing a landmark with a small processing load and high reliability.

In a past example of recognizing landmarks with a small processing load and high reliability, PTL 1 discloses, for example, "an image recognition device including an imaging device, a luminance change detection section that detects a luminance change of a horizontal line, a grouping section that determines the presence of a first horizontal line including a distribution pattern in which first and second luminance changes repeat alternately, a crosswalk candidate region extraction section that extracts a set of consecutive first horizontal lines as a candidate region of the crosswalk, a distance calculation section that calculates a distance to each set, and a crosswalk recognition section that recognizes the crosswalk by excluding the set having a distance equal to or larger than the threshold and determining the set having a distance smaller than the threshold as a region including the crosswalk". PTL 1 can recognize the crosswalk with high accuracy using a monocular camera.

CITATION LIST

Patent Literature

PTL 1: JP No. 2013-186664 A

SUMMARY OF INVENTION

Technical Problem

As described above, the landmark recognition device capable of recognizing a landmark with a low load and high reliability is needed. In the case where a camera is used to carry out landmark recognition, the landmark is, in many cases, not recognized properly due to partial missing or deformed shape caused by the condition of illumination or sunlight or the deterioration of the sigh or mark itself. Thus, it is desired to achieve a high recognition ratio with simple processing.

PTL 1 is an example of prior art techniques for recognizing the crosswalk with simple processing. PTL 1 uses the fact that the crosswalk includes a plurality of white lines painted at fixed distances to determine whether luminance-change points on the horizontal line, which are obtained from an image captured by a monocular camera, are disposed at fixed intervals. Thus, the recognition of the crosswalk is achieved with the monocular camera.

However, the landmarks include various road marks, such as stop lines and arrows other than crosswalks, and road signs installed on the roadside. Besides, the landmarks sometimes are partially missing, deformed, or tilted. Thus, various kinds of landmarks should be handled.

It is, therefore, an object of the present invention to provide a landmark recognition device and a recognition method capable of handling various kinds of landmarks and recognizing a landmark with a low processing load and high reliability, even when the landmark is partially missing due to weather condition or deterioration of the landmark.

Solution to Problem

To solve the above problem, a representative embodiment of a road landmark recognition device of the present invention is a landmark recognition device configured to recognize plural kinds of road marks drawn on a road and/or plural kinds of road signs installed on a roadside as landmarks, including image capturing means mounted on a moving body for capturing an image surrounding the moving body, and a processor configured to process the captured image to recognize a landmark, in which the processor includes a database storing landmark extraction information associated with landmark determination condition information, the landmark extraction information identifying a region including a landmark of the captured image for each kind of the landmarks, and allowing right-opposite positioning of the landmark, the landmark determination condition information determining landmark pattern information as the landmark, a segmentation processor configured to set a plurality of segmentation lines with respect to the region including the landmark of the captured image in a direction parallel to the landmark from a direction right opposite to the landmark, and determine a distance between intersections of the segmentation lines and a boundary of the landmark, a pattern extraction processor configured to obtain the landmark pattern information that represents a characteristic of the pattern of the landmark as numerical value information, in response to a distance between the intersections determined for each of the plurality of segmentation lines, and a database comparison processor configured to compare the landmark pattern information extracted in the pattern extraction processor with the landmark determination condition information registered in the database to identify the kind of the landmark.

Further, a representative embodiment of a road landmark recognition method of the present invention is a landmark recognition method for recognizing a landmark by capturing a surrounding image, in which landmark extraction information which is information of a region including the landmark of the captured image, a function for obtaining landmark pattern information representing a characteristic of a pattern of the landmark as numerical value information, and a determination condition equation for evaluating a numerical value calculated by the function as landmark determination condition information are provided as a set for each kind of landmark, the landmark recognition method for recognizing the landmark, including detecting a region including the landmark with respect to the captured image, identifying the set including the landmark extraction information of the region, executing the function for the identified set, and comparing the set to the landmark determination condition information of the identified set.

Advantageous Effects of Invention

The landmark recognition device and the landmark recognition method of the above embodiment can recognize the landmark with a low processing load and high reliability, even when the landmark is partially undetected due to weather conditions or deterioration of the landmark among a plurality of landmarks such as road marks or road signs.

BRIEF DESCRIPTION OF DRAWINGS

FIG. 3B illustrates a region-of-interest image of an image captured under the environment of FIG. 3a.

DESCRIPTION OF EMBODIMENTS

An embodiment of the present invention will be described below by referring to the accompanying drawings.

Embodiment

An embodiment of the present invention recognizes a landmark using an image capturing device mounted on a moving body by clipping a processing region of the landmark under traveling environment, setting line segments on the image, extracting intersections of the line segments and a boundary of the landmark, and comparing patterns by referring to a database that stores previously generated landmark patterns.

Figure 1:
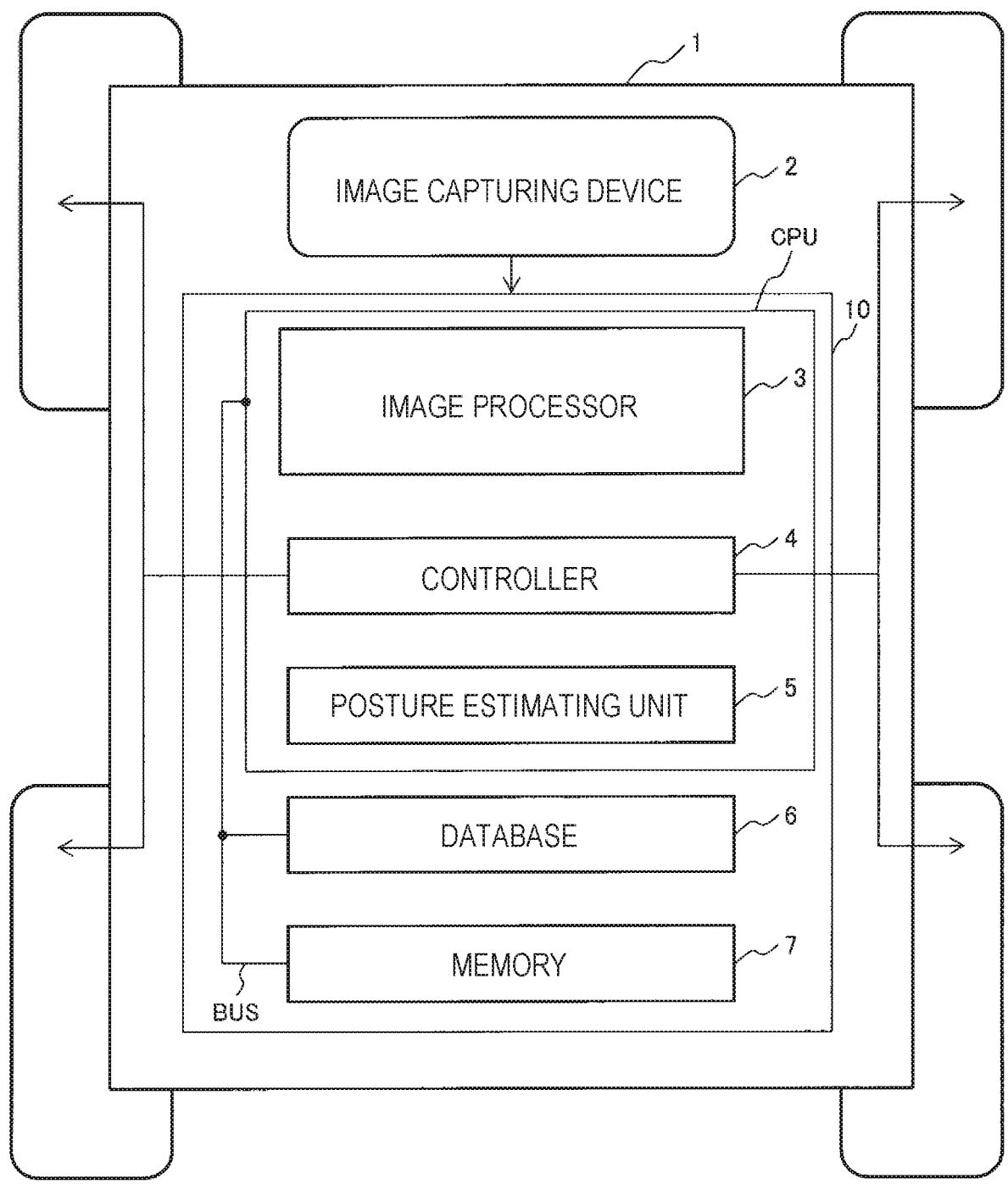
FIG. 1 illustrates the structure of a landmark recognition device according to an embodiment of the present invention when mounted on a moving body.

FIG. 1 illustrates the structure of a landmark recognition device according to the embodiment of the present invention when mounted on a moving body.

The landmark recognition device according to the embodiment of the present invention is mounted on a moving body 1. The landmark recognition device includes an image capturing device 2 that captures an image of surrounding traveling environment, and a processor 10 that processes the image captured by the image capturing device 2 to detect a landmark, and displays or outputs a control signal corresponding to the detection result. The processor 10 is often configured as a computing system including an arithmetic processing unit CPU, a database 6, a memory 7, a bus line BUS for interconnecting these components, and so on.

An outline of the processing function of the arithmetic processing unit CPU is as follows. The arithmetic processing unit CPU can be represented by an image processor 3 that processes an image captured by the image capturing device 2, a posture estimating unit 5 that estimates the posture of the moving body 1, and a controller 4 that externally outputs the calculation result of the image processor 3 and displays various items in accordance with the output, or controls the moving body 1.

The memory 7 holds various data, such as input data, intermediate processing data, and final output data, which are used in the arithmetic processing unit CPU for recognition of landmarks. The database 6 holds pattern data of landmarks.

Specific contents of processing of each component are described below.

First, the image capturing device 2 can be formed of, for example, a monocular camera or a stereo camera facing forward and mounted on the moving body 1. When the monocular camera is used as the image capturing device 2, the actual measurements of the landmark can be calculated geometrically. This is because the positional relationship between positions of pixels on the image and actual positions is fixed due to the planar road surface. The position of the landmark can be converted in accordance with predetermined measurements of the actual landmark if the landmark is installed at a place other than the road surface. When the stereo camera is used as the image capturing device 2, the distance to the landmark can be measured more precisely. A standard camera or a wide angle camera can be used so long as the camera has a viewing angle at which the landmark can be recognized during traveling. For simplifying the description, an example of adopting a single standard camera is described in the following. However, any camera finally generates a piece of an image regardless of the type of camera. In this respect, the image capturing device 2 may be formed by combining more than one camera.

The image capturing device 2 captures an image in response to a command from the controller 4 or at fixed time intervals, and outputs the captured image to the image processor 3 via the memory 7. An original picture of the captured image is stored in the memory 7, while subjected to intermediate processing in the image processor 3 to generate an intermediate processing image which is also stored in the memory 7 as needed. The original picture or the intermediate image stored in the memory 7 is appropriately used for determination or processing in the posture estimating unit 5, the controller 4, and so on. The result data used in the processing in the posture estimating unit 5 or the controller 4 are also stored appropriately in the memory 7.

The bus line BUS which transmits data among blocks can be made of an inter equipment bus (IEBUS), a local interconnect network (LIN), a controller area network (CAN), or the like.

The posture estimating unit 5 estimates the posture of the moving body 1 and outputs the estimated posture (azimuth, direction) to the image processor 3 via the memory 7. Accordingly, the information of the estimated posture (azimuth, direction) is stored in the memory 7. The posture estimating unit 5 can be formed of a sensor, such as the IMU or GPS, but the posture of the moving body relative to a traveling lane can be calculated by detecting the lane using the image of the road surface.

The database 6 includes registered patterns of landmarks to be recognized. A pattern of the landmark includes, for example, line segment information to be set at equal distances on the landmark image, and arrangement information of intersections between each line segment and the boundary of the landmark.

The image processor 3 uses the image captured by the image capturing device 2 during traveling of the moving body 1 to recognize the landmark. First, the intersections between the boundary of the landmark and the line segments are extracted using the image information transmitted from the image capturing device 2, the posture information from the posture estimating unit 5, and the line segment information from the database 6. Next, the intersections are compared to the arrangement information of the intersections from the database 6 to identify the landmark, and the identified result is output to the controller 4.

The embodiment of the present invention can recognize the landmark with only a single image captured by the image capturing device 2. However, the recognition of the landmark robust to the image capturing device or brightness of the surroundings can also be achieved using a plurality of images sequentially captured while the moving body 1 travels. Further, the embodiment of the present invention reduces the processing load, so that no processing is required to be carried out for the landmark which is already recognized. If a map that includes travel environment information, such as measurements and shape of the road, or kinds and positions of the landmarks, is prepared preliminary, it is possible to estimate whether the landmark exists near the moving body 1 according to the map information. Therefore, the image processor 3 may process only when the moving body 1 is located near the landmark. Specific contents of the processing of the image processor 3 will be described later by referring to FIG. 2.

The controller 4 estimates the position of the moving body 1 in accordance with the position of the landmark recognized by the image processor 3, and determines a future moving direction or speed to control the moving body 1. Alternatively, necessary information of the detection result is output and displayed on a screen to provide information to a driver.

Figure 2:
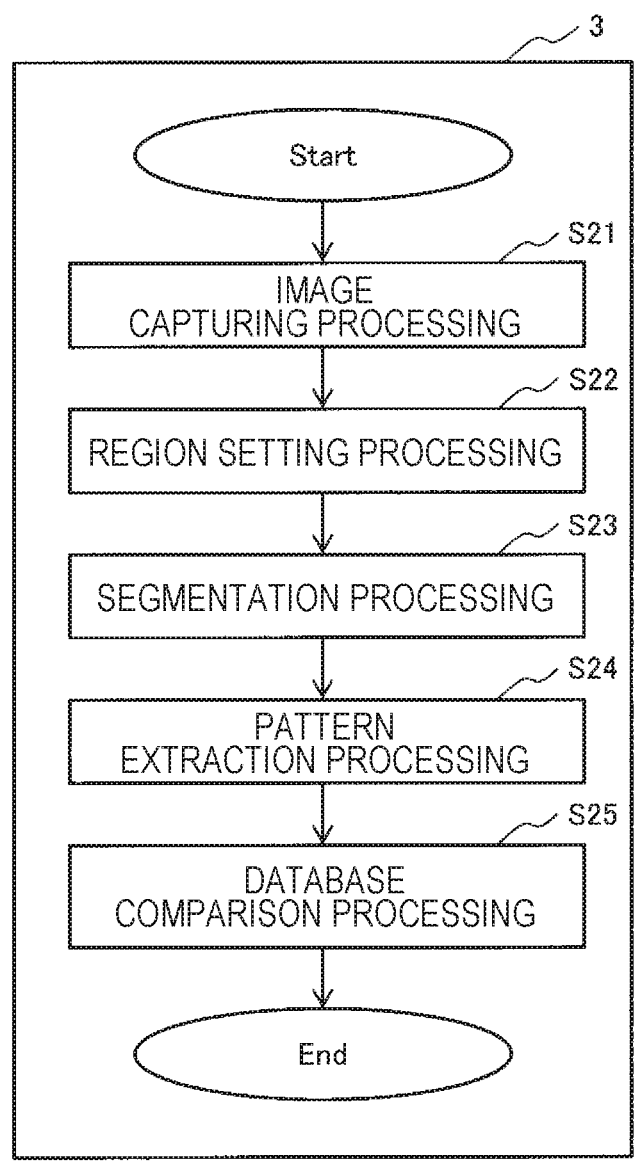
FIG. 2 is a flowchart illustrating processing contents of an image processor 3 of the landmark recognition device.

FIG. 2 is an example flowchart illustrating the contents of the processing of the image processor 3.

In an image capturing processing step S21, which is the first processing step in the sequence of the flowchart of FIG. 2, an image of the environment captured by the image capturing device 2 during travel of the moving body 1 is obtained from the memory 7.

Next, in a region setting processing step S22, a region of interest for recognizing a road mark or a road sign is set on the image captured by the image capturing processing step S21. To recognize travel lanes or road marks (e.g., stop lines, arrows, and crosswalks) drawn on the road surface, a road surrounding the moving body 1 is regarded as the region of interest. Meanwhile, to recognize road signs (e.g., destination indicators, stop signboards, or off-limits sign boards) drawn above the road or on the side of the road, a space above the road and around the moving body 1 is regarded as the region of interest. The region of interest may be set according to the information from the database 6, or in the car lanes acquired by a car-lane detection technique, as the landmark is placed in the travel lane when the landmark is the road mark. In the case of road signs, the region-of-interest may better be set outside the car lane acquired by the car-lane detection technique or outside (above the region of) the road surface, because the landmark is located outside the travel lane or above the road.

The car-lane detection technique is a technique to detect boundaries of the travel lanes using, for example, Hough transform or vanishing points to detect edges on the image, but other image processing techniques can also be used so long as the techniques can detect car lanes. A sensor that detects colors may be used to detect the travel lanes by extracting white or yellow lines. Alternatively, the travel lane can be detected on the image by estimating the position of the lane relative to the moving body by referring to a map in which the relative position of the lane is registered. In the case where the region of interest is the road sign, the region of interest can be set in accordance with a predetermined color of each sign.

In the segmentation processing step S23, the line segments are set at equal distances from each other in the image of the region of interest set in the region setting processing step S22, and the intersections of the individual line segments and the boundary (edge) of the landmark are detected. The embodiment of the present invention considers the posture of the moving body relative to the landmark in setting the equally-distanced line segments in the image of the region of interest. The line segments are set at equal distances in parallel with the travel direction of the moving body if the travel direction is right opposite to the landmark. Otherwise, the angle of the travel direction is corrected to be right opposite to the landmark in setting the line segments at equal distances. The posture of the moving body relative to the landmark can be determined from the car lane in the captured image.

In a pattern extraction processing step S24, an arrangement relationship of the intersections detected in the segmentation processing step S23 is calculated. The arrangement relationship of the intersections is largely different for each landmark, so that the arrangement relationship is used as a pattern for recognizing the landmark.

In a database comparison processing step S25, the pattern extracted in the pattern extraction processing step S24 is compared to the pattern registered in the database 6 to identify the landmark in the region of interest. The database 6 only consists of information of the arrangement relationship of the intersections obtained in the segmentation processing step S23. Thus, the database 6 has a small information amount, so that the pattern comparison processing can be executed with a low load. If the pattern calculated in the pattern extraction processing step S24 matches the pattern registered in the database 6, the pattern is recognized as the landmark pattern of the matched database. On the other hand, if there is no match with the registered pattern in the database 6, it is determined that the image obtained in the image capturing processing step S21 is other than the landmark.

Figure 3A:
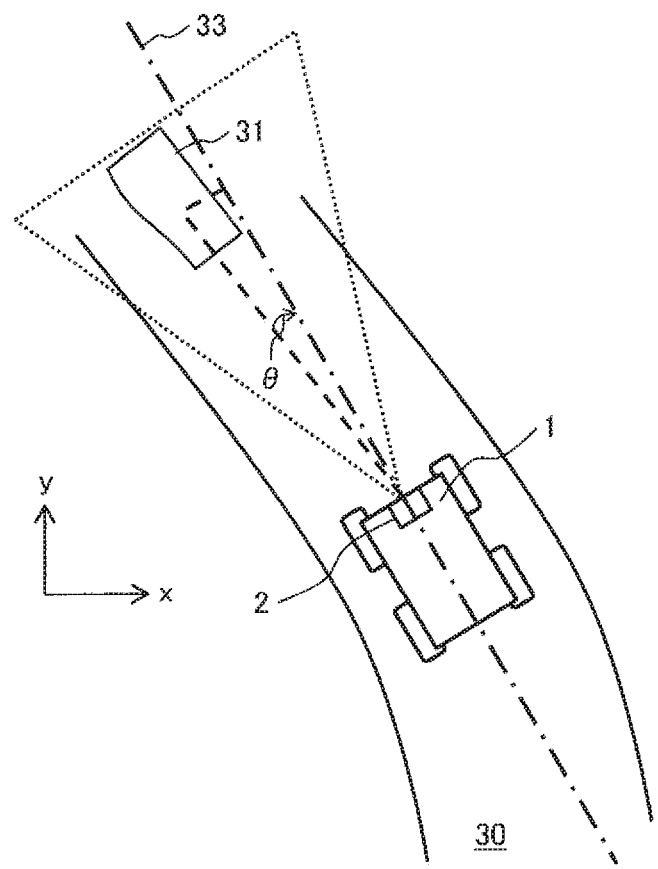
FIG. 3A illustrates a relationship between a moving body and a landmark on a road.
Figure 3B:
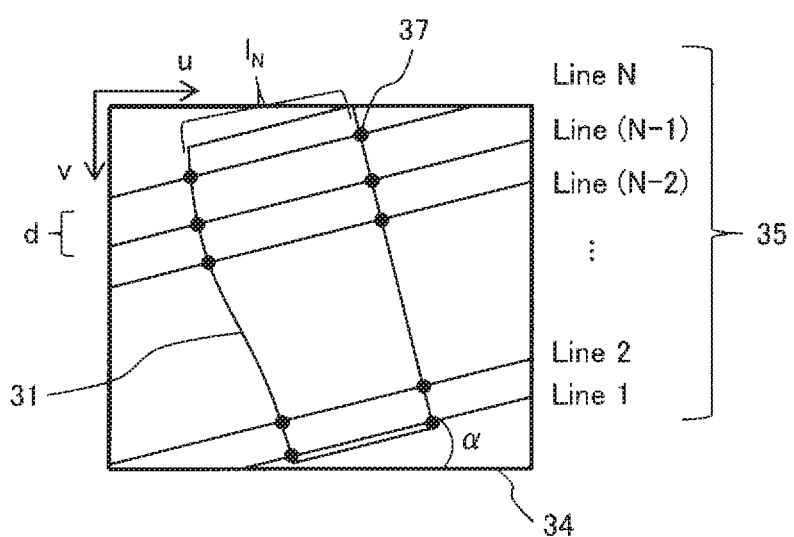

Referring to FIGS. 3a and 3b, the processing details of the segmentation processing step S23 is described.

FIG. 3a illustrates a relationship between a moving body and a landmark on the road. In the example illustrated in this drawing, a road 30 curves and the moving body 1 is located at a position not finishing the curve, so that the image capturing device 2 attached to the moving body 1 in the travel direction 33 cannot capture the landmark 31 at a right-opposite angle, and capture the image at an angle θ. Thus, the road 30 represents the environment in which the moving body 1 travels, and the landmark 31 is located in front of the moving body 1 during traveling on the road 30 and within the image capturing range of the image capturing device 2 mounted on the moving body 1.

As illustrated in FIG. 3a, the angle θ represents the posture of the moving body 1 relative to the landmark 31, and the posture estimating unit 5 can estimate the angle θ. In the image taken and captured by the image capturing device 2, the current posture (angle θ) can be obtained by measuring how much the direction of the lane obtained by the car-lane detection technique is shifted from the direction of the car lane (which is assumed to be set to a known value) during traveling in a straight line along the road. In FIG. 3a, (X, Y) are coordinate values on the road.

FIG. 3b illustrates a region-of-interest image of the image obtained under the environment of FIG. 3a. A region-of-interest image 34 is a partial image captured in the region extracted in the region setting processing step S22 from the entire image obtained by the image capturing device 2. Reflecting the fact that the posture of the moving body 1 is not right opposite to the landmark 31, the landmark 31 is tilted diagonally and its image is captured in the region-of-interest image 34. This angle represents coordinates (u, v) of the image of the region-of-interest, that is, a slope of the landmark 31 on the image.

The segmentation lines 35 set in the region-of-interest image 34 include Line 1, Line 2, . . . Line N, and are arranged parallel with each other in the region-of-interest image 34 of the image captured by the image capturing device 2. A distance d is a distance between Line 1, Line 2, . . . , Line N of the segmentation lines 35. The distance d is determined by dividing a height of an axis v of the region-of-interest image 34 of the image captured by the image capturing device 2 by the number of lines N of the segmentation lines 35. When the number of lines N increases, a recognition ratio of the landmark increases accordingly. However, a processing load also increases, so that the number of lines N needs to be set in accordance with the determined accuracy and processing load.

The intersections 37 are intersections of the boundary (edge) of the landmark 31 in the region-of-interest image 34 and the segmentation lines 35. The edge of the landmark 31 can be detected by an edge detector, such as Canny transform, Sobel filtering, or zero crossing.

IN represents a distance between the intersections on each segmentation line 35. The number of intersections on each segmentation line 35 is different for the landmark 31 (a plurality of intersections exists on each segmentation line), the pattern of the landmark 31 can be evaluated by the number or a length of the distance IN between intersections.

Figure 4:
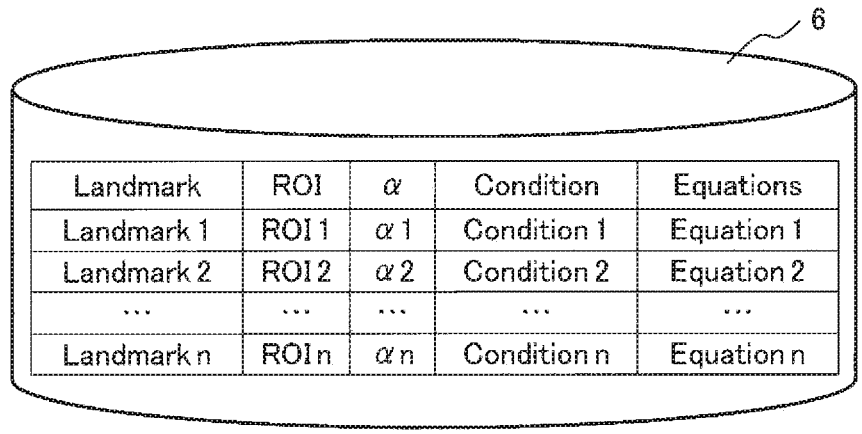
FIG. 4 illustrates a detailed example of a database of the landmark recognition device.

FIG. 4 illustrates a detailed example of the database 6. The landmark information, which is recognized by the image capturing device 2, is registered in the database 6. Data items registered in the database 6 include Landmark which is a symbol that identifies the landmark, ROI which is a symbol that determines the processing for determining the range of setting the region-of-interest 34, an angle of the segmentation line 35, Condition which is a condition that determines the pattern, and Equation which is a function representing the pattern. These data items are registered for each landmark of interest.

More specifically, Landmark includes Landmark 1 to Landmark n which are landmarks to be recognized and determined and registered as symbols for identifying the landmarks to be recognized, such as "arrow (travel direction)", "crosswalk", "stop line", or "stop (止まれ) sign". In this case, the landmark 1 represents "arrow (travel direction)" and Landmark 2 represents "crosswalk", and Landmark 3 represents "stop line", and Landmark 4 represents "stop (止まれ) sign."

ROI includes ROI 1 to ROI n which are registered as symbols for determining the processing for determining the setting range of the region of interest 34 of Landmark 1 to Landmark n. For example, in the example of Landmark 3 representing "stop line", ROI 3 is a symbol representing a forward and lower region of the road surface, as the stop line is drawn on the road surface. In the example of Landmark 4 representing "stop (止まれ) sign", the landmark is red, so that a symbol for starting processing for setting a region including a large red area as the region of interest is registered in ROI 4.

In α, calculating methods 1 to n of the angle of the segmentation lines 35 are registered. For example, n is set to θ, when the angle α of a reference segmentation line 35 is horizontal (0 degree) and the posture angle θ is corrected. Meanwhile, when the angle α of the reference segmentation line 35 is vertical (90 degrees), n is set to 90+θ to correct the posture angle θ. The segmentation lines 35 may be provided in a plurality of directions for each landmark. The number of lines N of segmentation lines 35 are registered here.

In Equation column, functions representing the patterns are registered as Equation 1 to Equation n. For example, the landmark 31 detected in ROI 3 is divided by the segmentation line 35 having the angle 3, and the distance IN between intersections is assigned to Equation 3. Here, the pattern is converted into a numerical value pattern. The numerical value pattern is put into the recognition condition, Condition 3.

In Condition, the conditions for recognizing the pattern are registered as Condition 1 to Condition n. For example, if a pattern in which the landmark 31 detected in ROI 3 is divided by the segmentation line 35 at the angle 3 satisfies Condition 3, the landmark 31 is recognized as "stop line" of the Landmark 3.

Figure 5A:
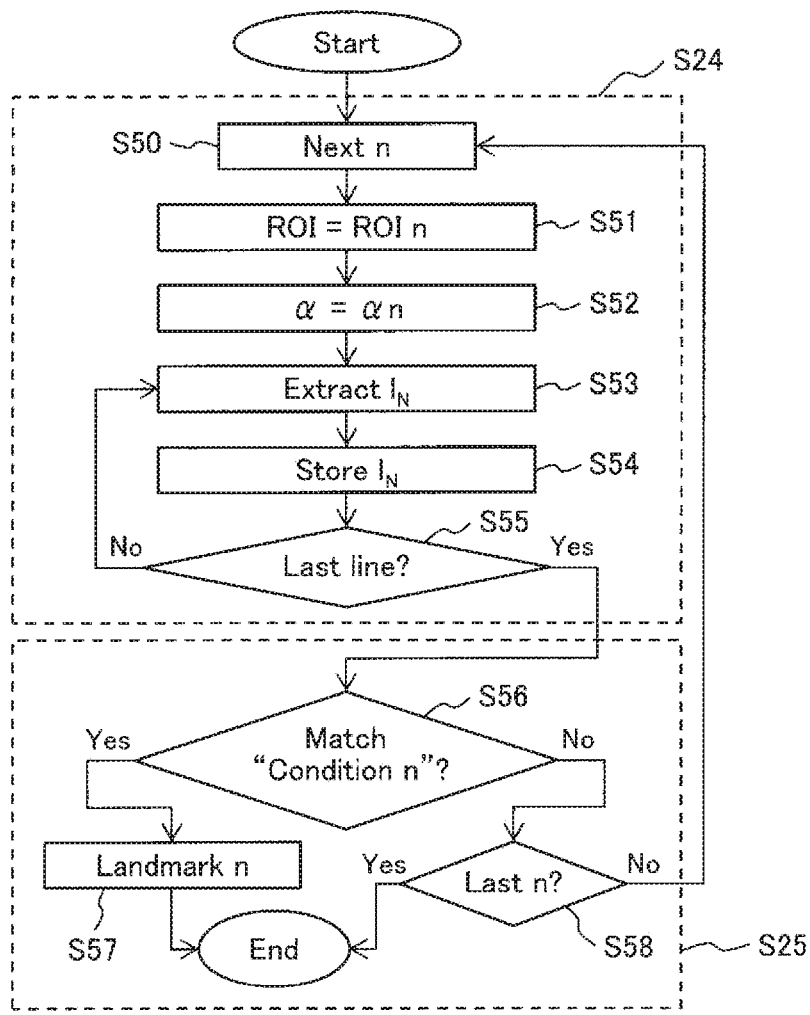
FIG. 5A is a flowchart illustrating the processing contents of pattern extraction and database investigation.
Figure 5B:
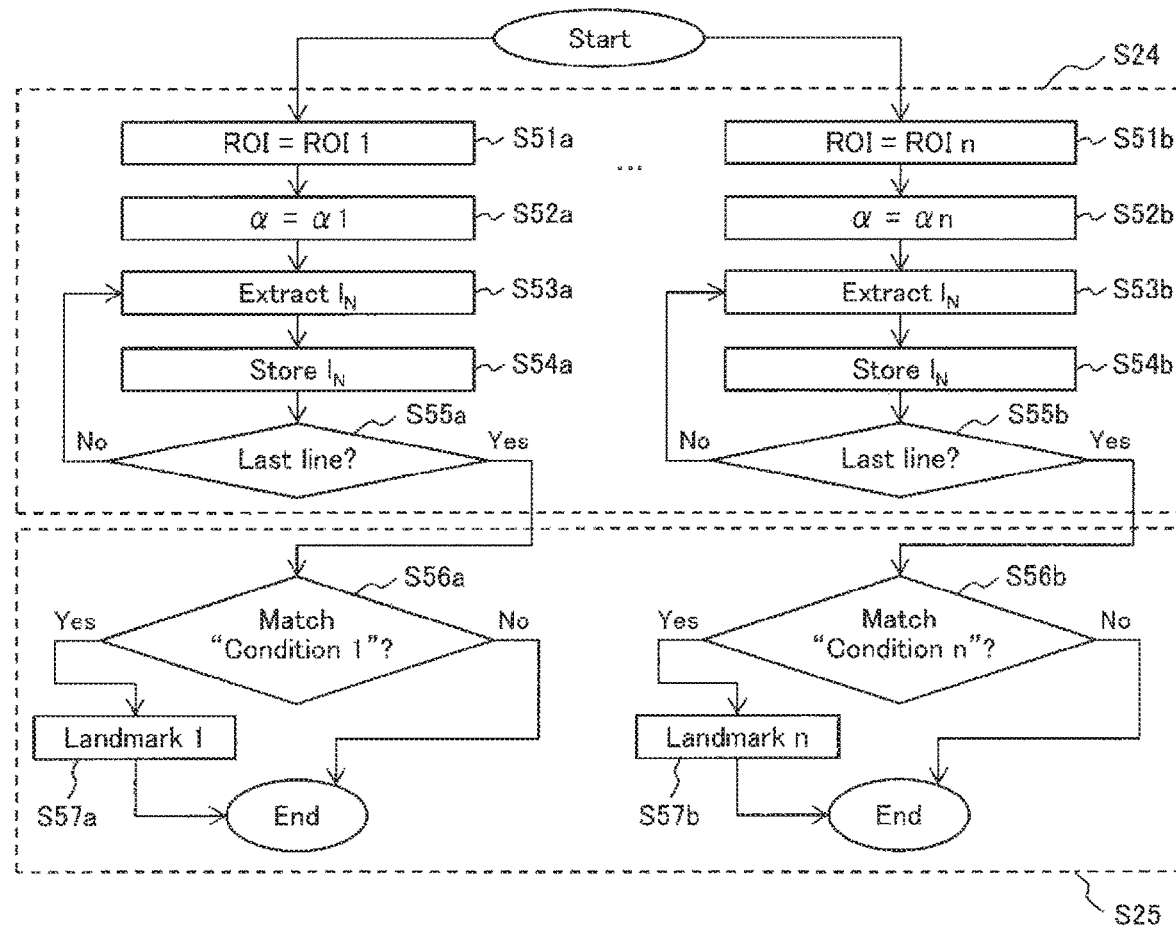
FIG. 5B is a flowchart illustrating the processing contents of pattern extraction and database investigation.

FIGS. 5a and 5b illustrate examples of flowchart for the pattern extraction processing step S24 and the database search processing step S25 in FIG. 2. FIG. 5a illustrates a uniprocess example in the computing unit, while FIG. 5b illustrates a multi- and parallel-process using a system a and a system b. The following description is provided by referring to FIG. 5a. FIGS. 5a and 5b illustrate details of the pattern extraction processing step S24 and the database search processing step S25. First, the pattern extraction processing step S24 is described.

In the pattern extraction processing step S24 of the flowchart of FIG. 5a, the first processing step S50 sets a variable n of Landmark 1 to Landmark n which are landmark identification symbols registered in the database 6 of FIG. 4. The processing step S50 starts from Landmark 1, where n=1, and subsequently n changes to n+1 until Landmark n which is the last landmark registered in the database 6.

In the processing step S51, the ROI n which is the processing symbol for determining the range of the region of interest is set. In the processing step S52, the angle of the segmentation line 35 is set.

In the processing steps S53 to S55, the segmentation distance IN between the intersections 37 obtained by the angle segmentation lines (Line N) 35 is extracted. In the processing step S54, the segmentation distance IN is stored in the memory 7. The number of segmentation lines 35 is counted from 1 to N in the processing step S54. When the number of segmentation lines 35 reaches N, the pattern extraction means ends, and the process proceeds to database search S25. If the number of segmentation lines 35 does not reach N, the process proceeds to the processing step S53 and repeats processing.

The above-described processing is the pattern extraction processing step S24. After completion of the sequence of steps, the process proceeds to the database search processing step S25.

In the first processing step S56 of the database search processing step S25, it is confirmed whether the pattern extracted in the pattern extraction processing step S24 matches the database information. The distance IN between the intersections stored in the pattern extraction processing step S24 is assigned to the pattern function, Equation, in the database 6 to provide the numerical value pattern. If this numerical value pattern satisfies the pattern recognition condition, Condition, the process proceeds to the processing step S57. If the pattern recognition condition, Condition, is not satisfied, the process proceeds to the processing step S58.

In the processing step S57, the landmark 31 that satisfies the pattern recognition condition, Condition n, is recognized in the processing step S56 as the landmark having the landmark identification symbol Landmark n.

In the processing step S58, it is confirmed whether the distance IN between intersections extracted in the pattern extraction processing step S24 has been compared to all registered patterns in the database 6. When the comparison with all patterns is completed, the database search step S25 ends. If the comparison with all patterns is not completed, the process proceeds to the processing step S50.

The landmark identification symbol, Landmark, is represented by ROI which is the symbol representing the region-of-interest setting-range determination processing, the angle, the pattern recognition condition, Condition, and the pattern function, Equation. In the case where the landmark identification symbol is Landmark, the pattern recognition condition, Condition, is not satisfied by the combination other than the region-of-interest setting-range determination processing symbol ROI and the angle. Therefore, the database search processing step S25 does not have to investigate all combinations of the region-of-interest setting-range determination processing symbols ROI 1 to ROI n, the angle 1 to n, and the pattern recognition conditions Condition) to Condition n.

That is, with respect to n region-of-interest setting-range determination processing symbols ROI n, angles n, and n pattern recognition conditions, Condition n, it is not necessary to execute investigation ($n^3$) times for all combinations. Instead, the maximum n times investigation is sufficient. To decrease the processing load, parallel processing can be executed with respect to the region-of-interest setting-range determination processing symbol ROI, as illustrated in FIG. 5b. In that case, the processing step S56 is replaced by processing steps S56a and S56b. In the processing steps S56b and S56a, it is confirmed whether the pattern extracted in the pattern extraction processing step S24 matches the information in the database.

The distance IN between the intersections stored in the pattern extraction processing step S24 is assigned to the pattern function, Equation n, in the database 6 to provide the numerical value pattern. If this numerical value pattern satisfies the pattern recognition condition, Condition n, the process proceeds to the processing step S57. If a pattern recognition condition, Condition n 43, is not satisfied, the processing step S25 ends.

For example, when Landmark 3 is "stop line" and Landmark 4 is the road sign "stop (止まれ)", the region-of-interest setting-range determination processing symbol ROI 3 is set to "road surface" and the region-of-interest setting range determination processing symbol ROI 4 is set to "red sign". As a result, the search can be executed with n=3 and n=4 simultaneously, so that the search time decreases by half. At this time, only the nearby landmarks may be processed by referring to the map, instead of executing all registered landmarks.

The database 6 described above and its relationship of use will be further described. First, the region-of-interest setting-range determination processing symbol ROI and the angle in the database 6 can be regarded as the landmark extraction information for identifying the region including the landmark in the captured image and enabling right-opposite positioning to the landmark. The pattern function, Equation, in the database 6 can be regarded as the function to obtain numerical value information of the landmark pattern information representing the characteristic of the landmark pattern. Further, the pattern recognition condition, Condition, can be regarded as the landmark determination condition information for determining the landmark pattern information as the landmark.

In addition, the landmark extraction information, the function, and the landmark determination condition information are prepared and stored in contrast to each kind of landmark. Therefore, if there are 10 kinds of landmarks, 10 sets of landmark extraction information are related to the function and the landmark determination condition information and stored in the database 6. In this case, n=10.

In executing the sequential processing of FIGS. 2, 5a, and 5b, the region setting processing S22 of FIG. 2 clips a plurality of regions of the image, which are previously estimated, and monitors the clipped regions. In this case, a plurality of regions described in the region-of-interest setting-range determination processing symbol ROI of the landmark extraction information is provided. The number of such regions is limited to a few (e.g., m<n) regions, such as a region on the road, an upper right region, or an upper left region.

When any landmark is recognized in these regions by the processing such as the segmentation processing S23 of FIG. 2, only some sets of the landmark extraction information relative to the function and the landmark determination condition information that match the region-of-interest setting-range determination processing symbol ROI can be identified. To determine that some landmark is recognized in the region, it is not necessary to execute the entire processing of the segmentation processing S23. Instead, the determination may be made according to the fact that the information of the intersections is obtained. Subsequently, if there are three combinations that match the region, the pattern function, Equation, which is described in the three combinations is executed sequentially. Meanwhile, when the range of the numerical values obtained by the function processing is determined against the pattern recognition condition, Condition, and one of the three sets fall within the range or not any one of the three sets fall within the range, the kind of the landmark is finally identified or no landmark is determined.

It is apparent from the procedure described above that the result can be obtained with a decreased amount of processing. High speed processing can be carried out.

Figure 6A:
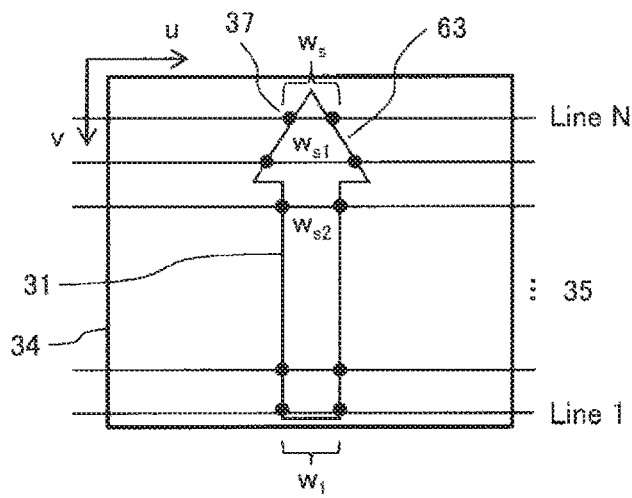
FIG. 6A is an example of a correct road mark "arrow (travel direction)".
Figure 6B:
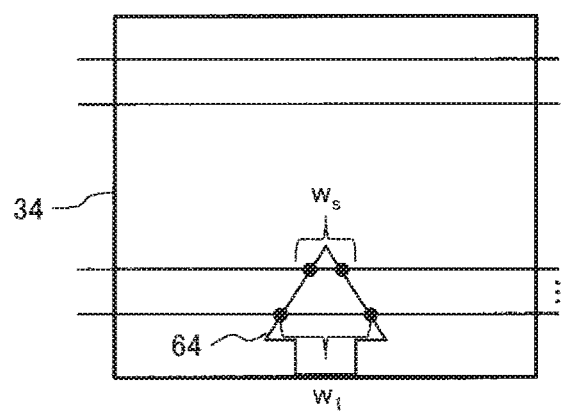
FIG. 6B is an example of partial detection of the road mark "arrow (travel direction)".
Figure 6C:
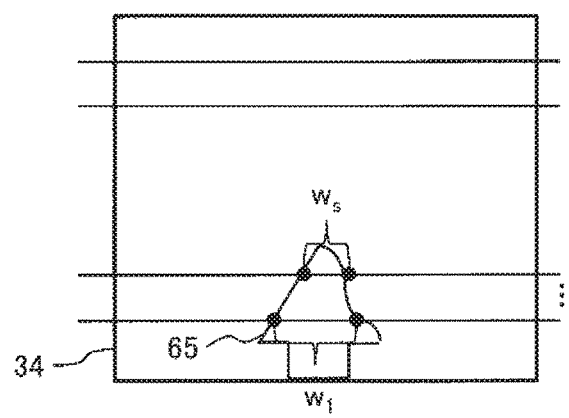
FIG. 6C is an example of a partially missing state of the road mark "arrow (travel direction)".
Figure 6D:
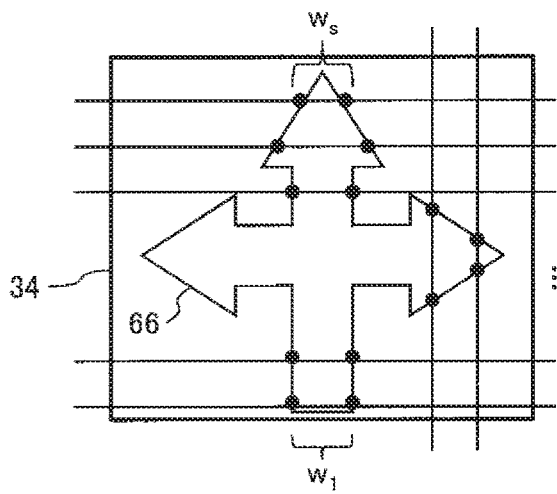
FIG. 6D is an analogous display example of the road mark "arrow (travel direction)".
Figure 6E:
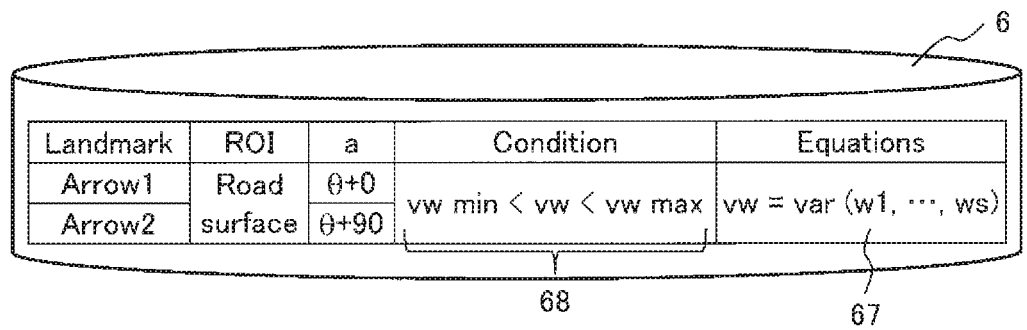
FIG. 6E is an example of data configured in a database 6 for recognizing the road mark "arrow (travel direction)".

FIG. 6e illustrates a recognition method in the case of the road mark "arrow (travel direction)". FIG. 6a illustrates the correct road mark "arrow (travel direction)", while FIGS. 6b, 6c, and 6d illustrate typical examples which are likely to be confused in recognizing the road mark "arrow (travel direction)". FIG. 6b illustrates a partially detected state, FIG. 6c is a partially missing state, and FIG. 6d is an analogous display example. FIG. 6e illustrates an example of data configured in the database 6 for recognizing the road mark "arrow (travel direction)".

The landmark 31 of FIG. 6a is the road mark "arrow (travel direction)" detected by the image capturing device 2 as an example of the correct road mark (arrow (travel direction)" which should originally be detected. The correct road mark "arrow (travel direction)" has a triangular head portion and a rectangular lower portion. FIG. 6a illustrates a distance W between intersections of each of the segmentation lines 35 (Line 1, Line 2, Line N) and the edge. In the illustrated example, the distance W between a plurality of intersections are illustrated, where W1 is a length on the near side of the rectangular shape and WS is a length on the upper triangle side.

Lengths w1 to ws are the distances between the intersections on each segmentation line 35. Although the number of the segmentation lines 35 is fixed to N, the number of intersections may change due to deterioration of the landmark or with environmental conditions. Thus, the number of the lengths w1 to ws is not always N. Therefore, the number of lengths that are actually extracted is set to s.

A head portion 63 of the road mark "arrow (travel direction)" indicates the upper triangle portion of the road mark "travel direction". In the case of the road mark "travel direction", the lengths ws2 and ws1 of the head portion 63 change relative to the v-axis, and its variance is regarded as a pattern and previously stored in the database 6 as a pattern function, Equation. According to FIG. 6e, the pattern function, Equation, of the database 6 previously stores an equation (VW=Var(W1, W2, . . . , WS) to determine variance VW for a plurality of detected lengths W.

The variance value VW determined from the distance between the intersections of the road mark "travel direction" should be in a predetermined range (maximum value VWmax and minimum value VWmin). Thus, the condition (VWmax>VW>VWmin) is stored in the pattern recognition condition, Condition, of the database 6.

Such data is previously held, and the variance vw described in the pattern function, Equation, is calculated with the detected lengths w1 to ws. If the variance value vw is within the predetermined range (vwmin to vwmax) set in the pattern recognition condition, Condition, the "travel direction" is recognized.

More specifically, in order to identify the road mark "arrow (travel direction)" as the landmark 31, the landmark identification symbol, Landmark, is set to "travel direction 1", the region-of-interest setting-range determination processing symbol ROI is set to "road surface", the angle is set to (+0), the pattern function, Equation n, is set to the variance vw=var(w1, W2, . . . ws), and the pattern recognition condition, Condition n, is set to the condition (vwmin<vw<vwmax) in the database 6, as illustrated in FIG. 6e.

A landmark 64 of FIG. 6b is the road mark "travel direction" that is partially undetected due to an obstacle or the imaging field of view of the image capturing device 2. In this case, the road mark "travel direction" can be recognized by assigning the detected lengths w1 to ws to the variance equation to detect the change of length.

A landmark 65 of FIG. 6c is an example of the road mark "travel direction" that is partially undetected due to the deterioration of the landmark 65. In this case, although the road mark is partially deteriorated, the "travel direction" can be recognized because the change of the length is detected from the lengths w1 to ws, the variance vw of the pattern function, Equation n, and the setting range of the pattern recognition condition, Condition n. To recognize a largely deteriorated target, it is necessary to previously adjust the minimum value vwmin and the maximum value vwmax of the setting range of the pattern recognition condition, Condition, corresponding to the magnitude of deterioration.

A landmark 66 of FIG. 6d has a characteristic similar to the characteristic of the landmark 31, but is a different kind of landmark. To recognize the arrow pointing forward, the forward direction can be recognized with the lengths w1 to ws, the variance, and the condition similar to those of the landmarks 31, 64, and 65. However, the landmark 66 should be distinguished from the landmark 31 and not regarded as the same landmark. The landmark 66 should not be determined only by the vertical characteristics because the landmark 66 includes right and left second and third arrows in addition to the vertical directions.

To distinguish this and also recognize the second and third arrows in the right and left directions, the segmentation lines 35 are drawn vertically to allow recognition according to the same principle as recognizing the arrows pointing forward. That is, the landmark is set to "travel direction 2 (right and left)", ROI is set to "road surface", α is set to (+90), Condition is set to the range from maximum to minimum values, and Equation n is set to the variance in the database 6. Then, the vertical characteristic is determined and the landmark is recognized and distinguished as a different kind of landmark including right and left sides. Although the function evaluating the landmark is set to the variance of the entire length ws of the landmark, the variance of the difference between adjacent ws can be used, or any value representing the landmark, such as the function representing the arrangement relationship, can be used.

Figure 7A:
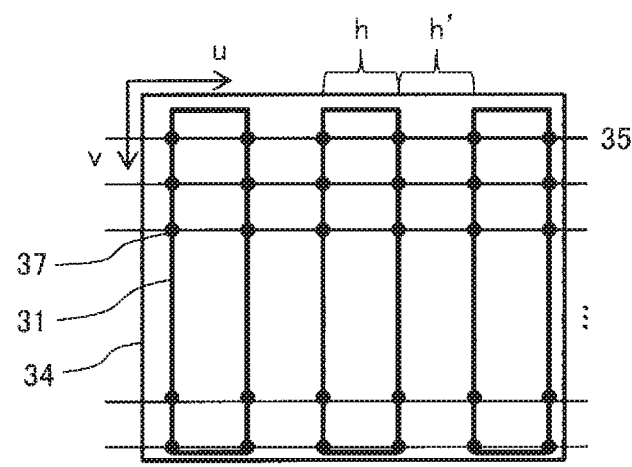
FIG. 7A is an example of a correct road mark "crosswalk".
Figure 7B:
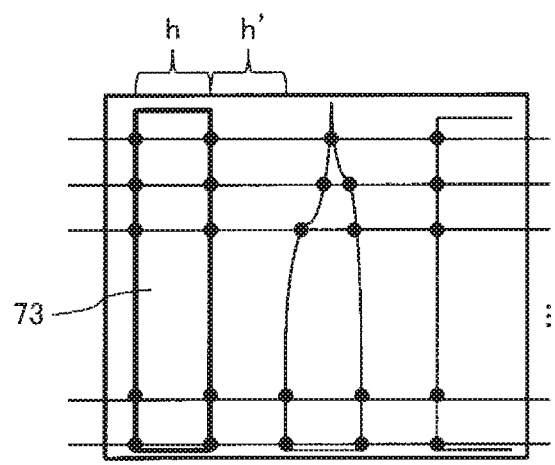
FIG. 7B is an example which is likely to be confused in identifying the road mark "crosswalk".
Figure 7C:
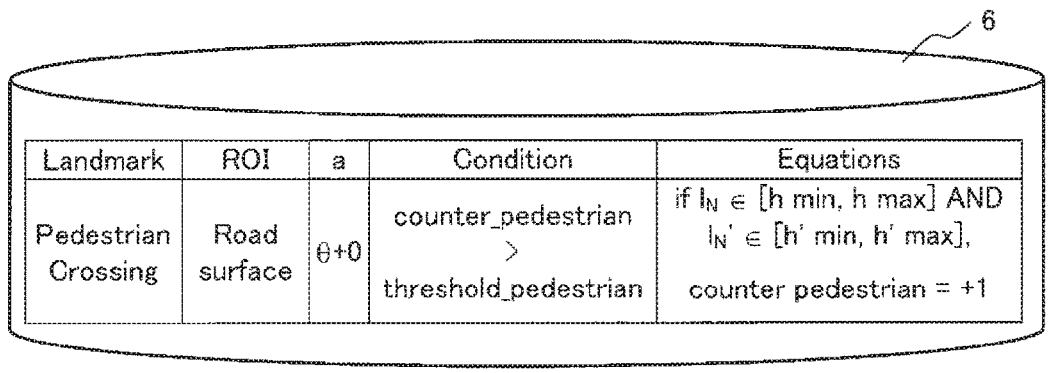
FIG. 7C is an example of data example of data configured in the database 6 for recognizing the road mark "crosswalk".

FIGS. 7a, 7b, and 7c illustrate an example recognition method of a road mark "crosswalk". FIG. 7a illustrates the correct road mark "crosswalk", while FIG. 7b illustrates a typical example which is likely to be confused in recognizing the road mark "crosswalk". FIG. 7b is an example of a partially missing state. FIG. 7c is an example of data configured in the database 6 for recognizing the road mark "crosswalk".

The landmark 31 of FIG. 7a is a "crosswalk" detected by the image capturing device 2. To identify the "crosswalk", a cycle period of a length h (width within the same mark) between intersections 37 and a length h' (distance between adjacent display marks) in the horizontal direction are considered. Such a cycle period of the crosswalk is identified as a pattern.

In the case of FIG. 7a, the distance IN between the intersections on each segmentation line 35 is also extracted, but the length h corresponding to the width within the same mark and the length h' corresponding to the distance between adjacent display marks are determined for each segmentation line 35. Then, the length h is recognized when the distance IN between the intersections is within [hmin, hmax]. Similarly, the length h' is recognized when IN is within [h'min, h'max].

To recognize the cycle period of the length h (width within the same mark) and the length h' (distance between adjacent display marks) between the intersections 37 as a pattern, several pattern functions are prepared in the pattern function, Equation, in the database 6, as illustrated in FIG. 7c. One function is to satisfy the calculation (the distance IN between intersections is within [hmin, hmax] and within [h'min, h'max] for determining the cycle period of the length h (width within the same mark) and the length h' (distance between adjacent display marks) between the intersections 37.

Subsequently, the number-of-times control concept of a counter, counter_pedestrian, of the number of times of pattern recognition, is set in the pattern function, Equation, of the database 6. Specifically, when both the lengths h and h' are recognized on the segmentation line 35, the counter, counter_pedestrian, for the number of times of recognition is set to increment by 1.

In FIG. 7c, the number of times of determination (a threshold, threshold_pedestrian) of the number of times of recognition is set as the pattern recognition condition, Condition, of the database 6.

By using the pattern function, Equation, and the pattern recognition condition, Condition, the number of times of recognition is counted on all segmentation lines 35. After that, if the counter, counter_pedestrian, for the number of times of recognition is equal to or larger than the threshold, threshold_pedestrian, the "crosswalk" is recognized.

That is, in order to identify the "crosswalk", Landmark is set to "crosswalk", the ROI is set to "road surface", α is set to (+0), the Condition is set to the counter, counter_pedestrian, for the number of times of recognition>threshold, threshold_pedestrian, the Equation is set to be within the range [hmin, hmax] and [h'min, h'max], and the counter is set to counter_pedestrian in the database 6, as illustrated in FIG. 7c.

A landmark 73 of FIG. 7b illustrates a "crosswalk" which is partially undetected by the image capturing device 2 because of the deterioration of the landmark 73. For example, the "crosswalk" can be recognized, even when the upper part of the "crosswalk" is deteriorated, by confirming that the range [hmin, hmax], the range [h'min, h'max], and the counter, counter_pedestrian satisfy the condition (threshold: threshold_pedestrian) using the information of the lower portion. To recognize a largely deteriorated target, it is necessary to adjust the above-mentioned range [hmin, hmax], the range [h'min, h'max], and the condition (threshold: threshold_pedestrian) of the counter: counter_pedestrian corresponding to the magnitude of the deterioration.

Figure 8A:
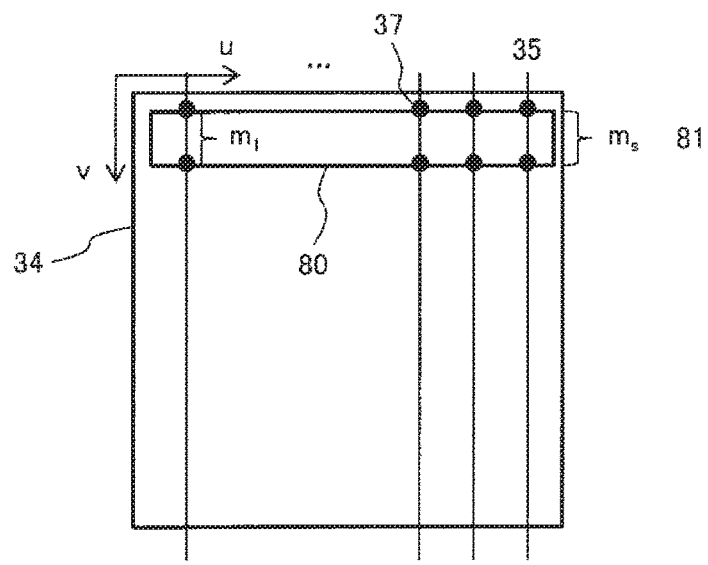
FIG. 8A shows an example of a correct road mark "stop line".
Figure 8B:
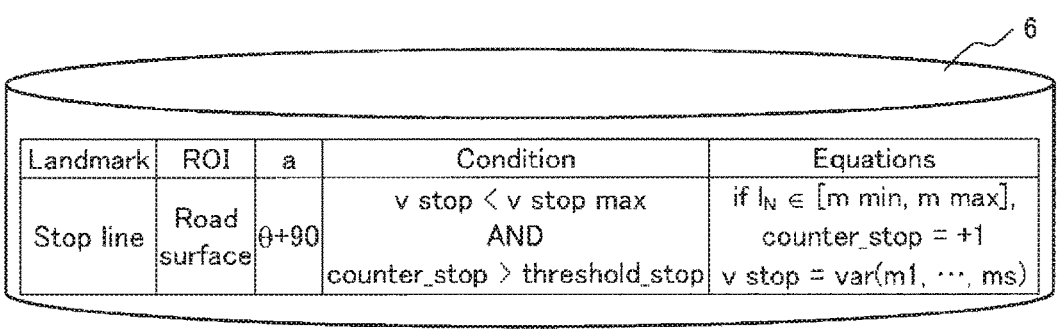
FIG. 8B is an example of data configured in the database 6 for recognizing the road mark "stop line".

FIGS. 8a and 8b illustrate an example recognition method of a road mark "stop line". FIG. 8a illustrates the correct example of the road mark "stop line", while FIG. 8b illustrates an example of data configured in the database 6 for identifying the pattern of FIG. 8a.

In FIG. 8a, the landmark 31 is a "stop line" detected by the image capturing device 2. The "stop line" has a fixed length ms (m1 to ms) relative to the v-axis. The segmentation line 35 is drawn vertically and a fixed length ms is recognized as a pattern. In this case, the distance IN between the intersections on each segmentation line 35 (with a length ms in this case) is extracted and, when the distance IN (ms) between intersections is within [mmin, mmax], the length ms is recognized.

As illustrated in FIG. 8b, the pattern function, Equation, of the database 6 stores a plurality of items as follows. First, when the length ms is provided on the segmentation line 35, the counter, counter_stop, for the number of times of recognition is incremented by 1. The presence of the length ms is confirmed when the magnitude of ms is within the range [mmin, mmax]. The pattern function, Equation, of the database 6 stores the equation (Vstop=Var(m1, . . . , ms) for determining the variance vstop. The variance vstop is theoretically zero, because the lengths of the stop line m1 to ms are fixed, and the distortion or the like of the image capturing device 2 is reflected.

As a result of the above calculation, the condition required to determine that the road mark is the "stop line" is set in the pattern recognition condition, Condition. The landmark 31 is regarded as "stop line" when the variance vstop is less than a previously set threshold vstopmax, and the counter, counter_stop, for counting the number of times of recognition is equal to or larger than an m threshold, threshold_stop.

That is, to recognize "stop line", the Landmark is set to "stop line", the ROI is set to "road surface", α is set to (+90), the range of the Equation is set to [m_min, m_max], and the counter, counter_stop, and the variance v_stop=var (m1, . . . , ms), and Condition are set to vstop<vstop_max and counter_stop>threshold_stop in the database 6, as illustrated in FIG. 8b.

Thus, the stop line can be recognized from the length ms, the range, the counter, variance and the condition, even when the stop line is partially undetected by the image capturing device 2. To recognize a largely deteriorated target, it is necessary to adjust the range, the counter, and the variance to correspond to the magnitude of the deterioration.

Figure 9A:
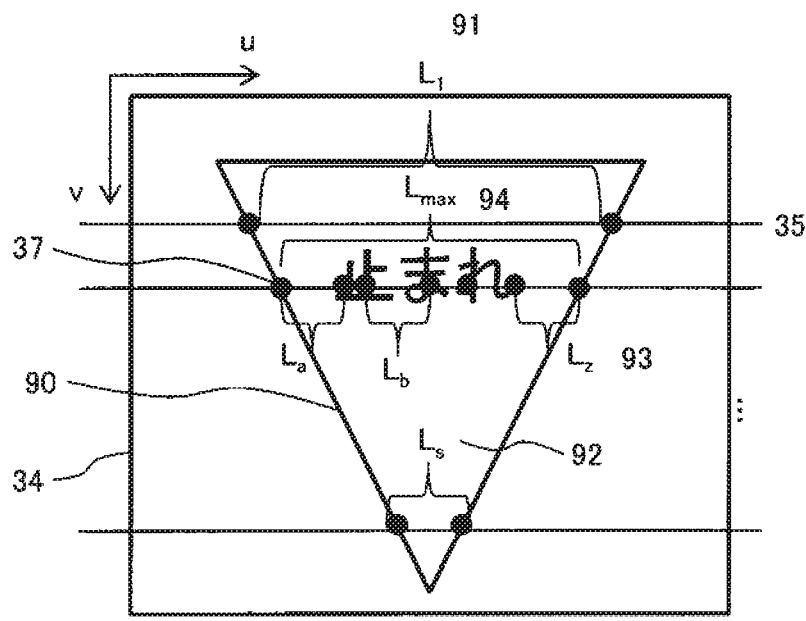
FIG. 9A is an example of a correct road sign "stop (止まれ) (temporary halt)".
Figure 9B:
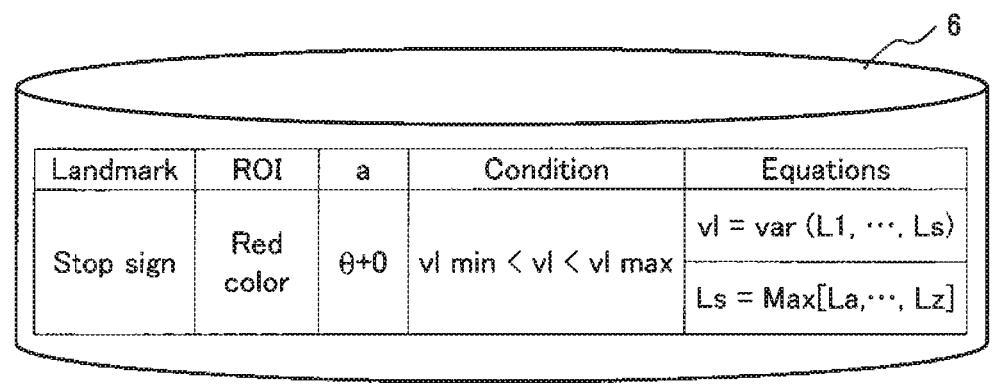
FIG. 9B is an example of data configured in the database 6 for recognizing the road sign "stop (止まれ) (temporary halt)".

FIGS. 9a and 9b illustrate an example recognition method of a road sign "stop (止まれ) (temporary halt)". FIG. 9a illustrates the correct road sign "stop (止まれ) (temporary halt)", while FIG. 9b illustrates a data example configured in the database 6 to identify the pattern of FIG. 9a.

In FIG. 9a, the landmark 31 is the "stop (止まれ) (temporary halt)" detected by the image capturing device 2. The road sign "stop (止まれ) (temporary halt)" consists of the lengths L1 to Ls between the intersections 37. A triangular sign, such as the road sign "stop (止まれ) (temporary halt)", the lengths L1 to Ls change relative to the v-axis, and its variance is identified as a pattern. In this case, the distance IN (length Ls herein) between intersections on each segmentation line 35 is extracted and, when the distance IN (Ls) between intersections is within the range [Lmin, Lmax], the existence of the length Ls is recognized. In the case of the road sign "stop (止まれ) (temporary halt)", a plurality of lengths (e.g., La, Lb, . . . , Lz) may sometimes be measured when, for example, the segmentation line 35 passes through a portion of characters.

In FIG. 9b, the pattern function, Equation, of the database 6 stores a plurality of items listed below. First, determination of the variance vl=var(L1, . . . , Ls) using the lengths L1 to Ls is stored. To prevent occurrence of erroneous recognition, the maximum length Lmax of the distances La to Lz between intersections on each segmentation line 35 can be calculated with the function, Ls=Max[La, Lz]. The maximum value of the lengths obtained on the segmentation line is reflected in determining the variance vl=var(L1, ..., Ls). The variance can also be determined by reflecting the sum of the plurality of lengths.

As a result of the above calculations, the pattern recognition condition, Condition, sets a determination condition so that the road sign is determined to be "stop (止まれ) (temporary halt)". Herein, the road sign "stop (止まれ) (temporary halt)" is recognized when the condition vlmin<vl<vlmax is satisfied.

That is, to recognize the road mark "stop (止まれ) (temporary halt)", Landmark is set to "stop (止まれ) (temporary halt)", ROI is set to "red mark", α is set to (+0), Condition is set to vlmin<vl<vlmax, and Equation is set to the variance vl=var(L1, ..., Ls) and the function Ls=Max[La, ..., Lz] in the database 6 of FIG. 9b.

Thus, the road sign can be recognized correctly even when the road sign includes characters.

REFERENCE SIGNS LIST 1 moving body
2 image capturing device
10 processor
6 database
7 memory
BUS bus line
CPU arithmetic processing unit
30 road
31 landmark
32 angle θ
34 region-of-interest image
35 segmentation line
37 intersection
d distance
1N distance between intersections
S21 image capturing processing step
S22 region setting processing step
S23 segmentation processing step
S24 pattern extraction processing step
S25 database comparison processing step
Landmark landmark identification symbol
ROI region-of-interest setting-range determination processing symbol
angle
Condition pattern recognition condition

The invention claimed is:

1. A landmark recognition device configured to recognize plural kinds of road marks drawn on a road and/or plural kinds of road signs installed on a roadside as landmarks, comprising:
a camera mounted on a moving body for capturing an image surrounding the moving body; and
a processor configured to process the captured image to recognize a landmark, wherein
the processor includes
a database storing landmark extraction information associated with landmark determination condition information, the landmark extraction information identifying a region including a landmark of the captured image for each kind of the landmarks, and allowing right-opposite positioning of the landmark, the landmark determination condition information determining landmark pattern information as the landmark,
a segmentation processor configured to set a plurality of segmentation lines with respect to the region including the landmark of the captured image in a direction parallel to the landmark from a direction right opposite to the landmark, and determine a distance between intersections of the plurality of segmentation lines and a boundary of the landmark, where the plurality of segmentation lines are parallel with respect to one another,
a pattern extraction processor configured to obtain the landmark pattern information that represents a characteristic of the pattern of the landmark as numerical value information, in response to a distance between the intersections determined for each of the plurality of segmentation lines, and
a database comparison processor configured to compare the landmark pattern information extracted in the pattern extraction processor with the landmark determination condition information registered in the database to identify the kind of the landmark.

2. The landmark recognition device according to claim 1, wherein
the database includes
information of the region including the landmark of the captured image and information of an angle for right-opposite positioning of the landmark as the landmark extraction information for each kind of landmark,
a function for obtaining the landmark pattern information representing the characteristic of the pattern of the landmark as numerical value information for each kind of the landmark, and
a determination condition equation for evaluating a numerical value calculated by the function as the landmark determination condition information for each kind of the landmark.

3. The landmark recognition device according to claim 2, wherein
the segmentation processor is configured to
estimate a posture of the moving body relative to the landmark,
determine a region and an angle with which the plurality of segmentation lines are set on the image in accordance with the posture and the region and angle of each landmark registered in the database, and
determine a distance between the intersections of the segmentation line and the boundary of the landmark.

4. The landmark recognition device according to claim 2, wherein
the pattern extraction processor is configured to
assign coordinates of each intersection to the function of each landmark registered in the database, and
convert the coordinates to landmark pattern information.

5. A landmark recognition method for recognizing a landmark by capturing a surrounding image, wherein
landmark extraction information which is information of a region including the landmark of the captured image,
a function for obtaining landmark pattern information representing a characteristic of a pattern of the landmark as numerical value information, and
a determination condition equation for evaluating a numerical value calculated by the function as landmark determination condition information,
are provided as a set for each kind of landmark,
the landmark recognition method for recognizing the landmark, comprising:
detecting a region including the landmark with respect to the captured image;
determining a distance between intersections of a plurality of segmentation lines and a boundary of the landmark, where the plurality of segmentation lines are parallel with respect to one another;

identifying the set including the landmark extraction information of the region using a distance between the intersections determined for each of the plurality of segmentation lines;

executing the function for the identified set; and comparing the set to the landmark determination condition information of the identified set.

* * * * *